(No Model.)

W. G. FLANDERS.
Steam Cooker.

No. 234,865. Patented Nov. 30, 1880.

Witnesses.
H. S. Talbot
W. R. Marble

Inventor.
William G. Flanders,
By Sylvanus Walker
Attorney

UNITED STATES PATENT OFFICE.

WILLIAM G. FLANDERS, OF LANSINGBURG, NEW YORK.

STEAM-COOKER.

SPECIFICATION forming part of Letters Patent No. 234,865, dated November 30, 1880.

Application filed September 1, 1880. (No model.)

*To all whom it may concern:*

Be it known that I, WILLIAM G. FLANDERS, of Lansingburg, in the county of Rensselaer and State of New York, have invented certain new and useful Improvements in Steam-Cookers, of which the following is a specification.

The objects of my invention are to provide a cheap, simple, and convenient steam-cooker which may be used for culinary purposes, and is adapted for use upon a gas or kerosene stove, and is so constructed as to prevent the escape of steam and odors into a room when cooking; and it consists in the construction, combination, and arrangement of the several parts, as hereinafter described.

Figure 1:
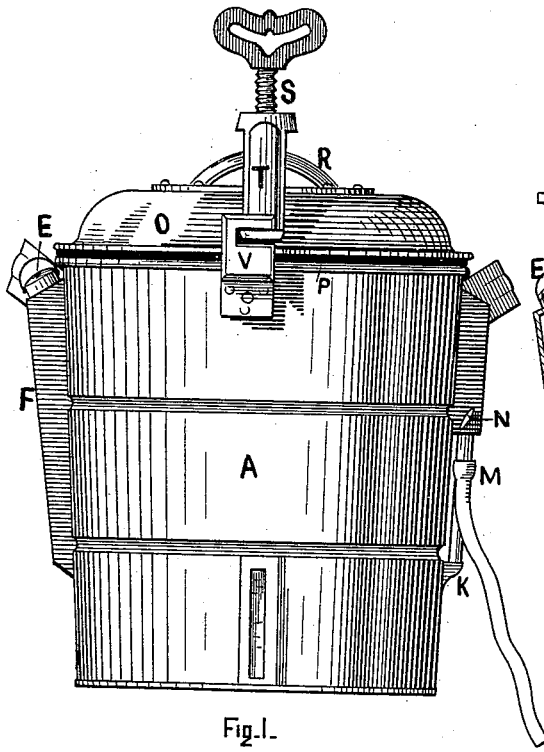
Figure 2:
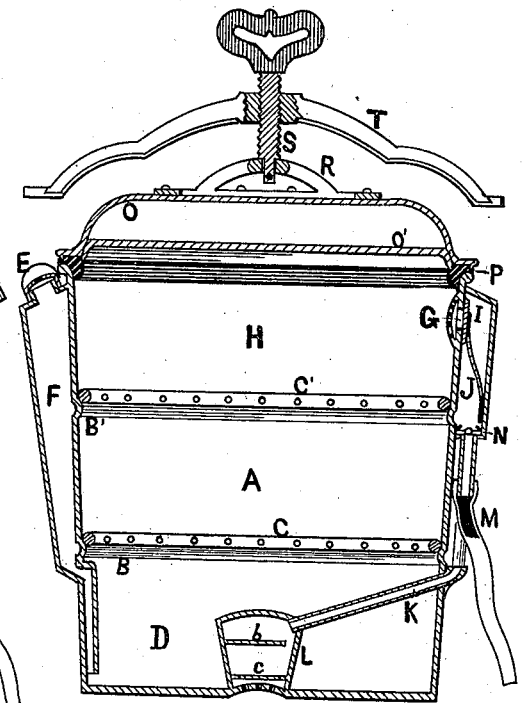
Figure 3:
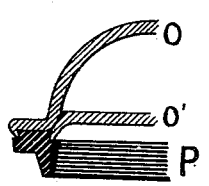
Figure 4:
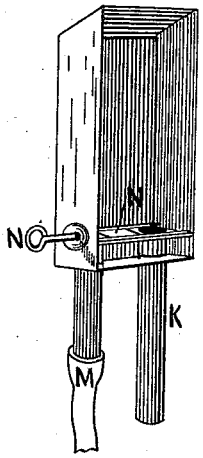
Figure 5:
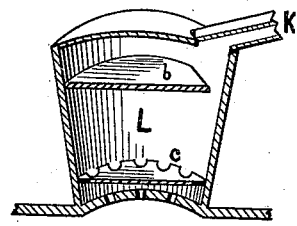

Figure 1 is an elevation of my invention. Fig. 2 is a vertical central section of same. Fig. 3 is a similar view of a portion of the cover, showing the method of connecting the rubber packing-ring therewith. Fig. 4 is a perspective view, showing interior of the valve-case with sliding valves and double steam-escape pipes. Fig. 5 is a sectional perspective view, showing interior of the steam-evaporator.

A represents a steam-cooker or tin vessel, provided in its upright side with inwardly-projecting circumferential beads B B', upon which rest the wire disks C C', which are removable in order to permit food to be placed thereon preparatory to being cooked by steam generated from water placed in the lower portion of the vessel or boiler D, which may be replenished at any time by removing the whistle-cap E from the upper end of the supply-tube F, attached to the outside of the vessel and extending downward to the said boiler portion D, where it enters the same, and thence extends downward to within about half an inch of the bottom, where it terminates in an open end, as heretofore employed.

G represents an opening formed in the side near the top of the upper steam-compartment, H, and is provided with a perforated shield, as shown.

I represents a steam-escape valve secured at the outside of the vessel opposite the opening G, and held closed by a sheet-metal spring, J, which is acted upon when the pressure of steam becomes too great for safety, so as to allow a portion to escape through said opening and valve, and thence through the steam-exit pipe K, which leads down the outside of the vessel to the boiler D, where it enters the same and extends on an incline to near the center thereof, where it opens into the evaporator L. (Shown in Figs. 2 and 5.) This chamber is provided with an upper horizontal partition, *b*, having an opening at one side, and near the bottom is provided with a similar horizontal partition, *c*, having a series of holes or openings near its edge or juncture with the sides of the same, which are on an incline outward from top to bottom, or its lower edge, which is soldered to the bottom of the boiler, which is formed convex within the circumference of the chamber and provided with fine holes, as shown, so as to allow any condensed steam to be evaporated or reconverted into steam again, by which means this steam-cooker may be used upon a common gas or kerosene stove and avoid the dripping of water or condensed steam upon the flame, as is the case with those heretofore constructed having an escape-pipe to permit the steam and water of condensation to enter the opening of a stove or range upon which it was placed when in use for culinary purposes.

Now, in order to utilize the heat from the escape-steam, I have provided an extra steam-escape pipe, M, and arranged a sliding valve, N, which may be moved back and forth to close or shut off steam from exit-pipes K or M, as desired.

When the steam-cooker is in operation, in order to utilize the extra steam I move slide N so as to close steam-exit pipe K and open exit-pipe M, the lower end of which is provided with a flexible tube, the end of which may be inserted in a separate vessel, so as to heat the contents thereof, as desired, and thus carry off or prevent disagreeable odors from entering the room.

In order to close the mouth or top of the steam-cooker H A D steam-tight, I provide the cover O with a rubber packing-ring, P, consisting of an angular body portion having an incline face or beveled downward-projecting flange, which fits the mouth of the said vessel, and an outward horizontal projecting flange, which rests upon the top edge of the sides or mouth of the cooker or vessel, as shown in Figs. 1 and 2. I secure this packing-ring P to the cover O by providing the upper surface of the ring with an upward-projecting body or tongue of dovetail form and fitting the periphery or outer edge of the cover O by bending or turning it downwardly and inwardly, then fitting and securing to the interior of the cover O a supplemental disk, O', or an annular flange, the periphery of which is curved downward and outward, so as to fit the groove or opposite side of the dovetailed-shaped projection and opposite the inwardly-projecting edge of the cover O, as shown in Fig. 3.

Now, in order to close the mouth of the steam-cooker against the possible escape of steam, I provide the said cover O with a crown or truss piece, R, secured thereto permanently and provided with a central hole, into which is fitted a round tenon or downward-projecting end of a thumb-screw, S, which fits within a screw-threaded hole formed in the center of the curved cover-bar T, the ends of which are passed or swung around horizontally beneath the ear-hooks V, secured to opposite sides of the vessel near its rim or mouth, as shown in Fig. 1.

It will be seen that by turning the thumb-screw S the cover packing-ring may be made to fit the mouth of the vessel (even if irregular) in a very easy and expeditious manner, so as to render the same steam-tight and prevent the escape of odors therefrom, and permit the ready removal of the same by unscrewing the thumb-screw, which, if desired, may be connected to the crown, truss, or bridge piece R by a pin passing through the end of the tenon below the same.

Having thus described my invention, what I claim is—

1. The steam cooking-vessel A, provided with hooked ears V, and the cover O, provided with the crown, truss, or bridge R, and having the cover-bar T connected therewith by the thumb-screw S, and adapted to engage with the said ears V, as described, and the rubber packing-ring P, permanently attached to said cover, whereby the same may be made to bear upon the top edge or mouth of the said vessel A, so as to close the same steam-tight, substantially as shown and described, as and for the purposes set forth.

2. In combination with the steam cooking-vessel A, provided with a cover, O, and spring-valve I J, the steam-exit pipes K and M and sliding valve N, constructed to operate essentially as described, as and for the purposes set forth.

3. In combination with the steam-cooker provided with the steam-exit pipe K, the chamber L, provided with the horizontal partitions b c, and secured to the perforated convex portion of the boiler-bottom, as shown and described, as and for the purposes set forth.

4. In combination with the steam cooking-vessel A, having a cover, O, and provided with the steam-exit pipe K and sliding valve N, the auxiliary steam-exit pipe M, arranged to operate substantially as described, as and for the purposes set forth.

5. The cover O, provided with an inward-projecting edge, and supplemental disk, O', having an outward-curved edge, whereby the rubber packing-ring P is permanently connected therewith, the said rubber packing-ring being adapted to fit within the mouth of the vessel and have a seat or bearing upon the top edge of the same, substantially as shown and described, as and for the purposes set forth.

WILLIAM G. FLANDERS.

Witnesses:
W. F. POOL,
ISAAC N. BOWMAN.